United States Patent
Velazquez et al.

(10) Patent No.: US 7,210,748 B1
(45) Date of Patent: May 1, 2007

(54) MOTORCYCLE HUB ADAPTER

(76) Inventors: Isaac Velazquez, 8240 NW. 168 St., Miami Lakes, FL (US) 33016; Ariel Alfonzo, 2781 Sheridan Ocean Club, Hollywood, FL (US) 33020

( * ) Notice: Subject to any disclaimer, the term of this patent is extended or adjusted under 35 U.S.C. 154(b) by 267 days.

(21) Appl. No.: 11/079,572

(22) Filed: Mar. 15, 2005

(51) Int. Cl.
*B62L 5/00* (2006.01)

(52) U.S. Cl. .................... 301/110.5; 301/6.9; 188/26

(58) Field of Classification Search ............ 301/6.9, 301/35.629, 110.5; 188/26
See application file for complete search history.

(56) References Cited

U.S. PATENT DOCUMENTS

| | | | |
|---|---|---|---|
| 4,585,276 A * | 4/1986 | Tirheimer | 301/36.1 |
| 6,238,009 B1 | 5/2001 | Lovitt, Jr. | 301/111.01 |
| 6,578,676 B1 * | 6/2003 | Lin | 188/26 |
| 6,626,502 B1 | 9/2003 | Petrak | 301/35.631 |
| 6,685,275 B2 * | 2/2004 | Gorges et al. | 301/35.629 |
| 6,880,897 B2 * | 4/2005 | Goss et al. | 301/6.9 |
| 7,044,272 B2 * | 5/2006 | Takizawa | 188/26 |
| 7,097,259 B2 * | 8/2006 | Toyoda | 301/110.5 |
| 7,143,872 B2 * | 12/2006 | Takizawa | 188/26 |
| 2006/0219488 A1 * | 10/2006 | Chen | 188/26 |
| 2006/0284472 A1 * | 12/2006 | Chen | 301/6.9 |

\* cited by examiner

*Primary Examiner*—Russell D. Stormer
(74) *Attorney, Agent, or Firm*—Sanchelima & Assoc., P.A.

(57) ABSTRACT

A motorcycle hub adapter for shaft driven motorcycles that permits a user to mount any custom wheel to a shaft driven motorcycle assembly. The adapter includes a housing that has a substantially hemispherical shape with a convex side with an opposite relatively flat opposite side. The adapter includes a central through opening extending from a round flattened end on the convex side with cooperative dimensions to receive the axle therethrough. Several peripheral annular surfaces are provided with holes to mount the brake disk rotor assembly at the farthest possible distance form the rim while other components of the motorcycle are also mounted to make them compatible with the rim assembly.

3 Claims, 5 Drawing Sheets

MOTORCYCLE HUB ADAPTER

BACKGROUND OF THE INVENTION

1. Field of the Invention

The present invention relates to a motorcycle hub adapter, and more particularly, to a hub adapter that permits a user to mount any custom wheel to a shaft driven motorcycle.

2. Description of the Related Art

Several designs for hub adapters have been designed in the past. None of them, however, includes a hemispheric housing that permits a user to assemble all the components of a driven motorcycle wheel on one side, including the disk brake rotor assembly, while minimizing the visual obstruction of the rim assembly.

Applicants believe that a related reference corresponds to U.S. Pat. No. 6,238,009 issued to Lovitt, Jr. on May 29, 2001 for a wheel and adapter. Lovitt's patent discloses a wheel adapter for a conventional vehicle hub to a wheel having a large inward offset, thereby permitting the original wheel track of the vehicle to be changed to match the width of a railroad track so the tires of the vehicle will sit on the railroad track. However, it differs from the present invention because there is no disclosure, or even preoccupation, for an adapter that permits a user to mount all the motorcycle wheel's components to one side to improve aesthetics preventing the obstruction of the rim assembly. Additionally, the present invention provides a user with the flexibility of using different rim assemblies while the visual obstruction is minimized. This is not taught in the patented invention.

Applicants believe that another related reference corresponds to U.S. Pat. No. 6,626,502 issued to Petrak on Sep. 30, 2003 for a wheel and adaptor plate system. Petrak's patent discloses a wheel adapter plate system for mounting a wheel rim onto a hub having a different lug bolt pattern. The wheel adapter plate system includes a plate member comprising a plurality of mounting apertures extending through the plate member. However, it differs from the present invention because Petrak's adapter plate system does not permit a user to mount all the motorcycle wheel's components to one side with minimum rim visual obstruction while also providing a user with the flexibility of using different rim assemblies. Petrak's patent does not even suggest its use with shaft driven motorcycles.

Other patents describing the closest subject matter provide for a number of more or less complicated features that fail to solve the problem in an efficient and economical way. None of these patents suggests the novel features of the present invention.

SUMMARY OF THE INVENTION

It is one of the main objects of the present invention to provide a motorcycle hub adapter that gives a user the flexibility of using different rim assemblies while the visual obstruction of the rim assembly is minimized.

It is another object of this invention to provide a motorcycle hub adapter that permits a user to mount all the motorcycle wheel's components on one side.

It is still another object of the present invention to provide a motorcycle hub adapter that permits a user to mount any custom wheel.

It is yet another object of this invention to provide such an adapter that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
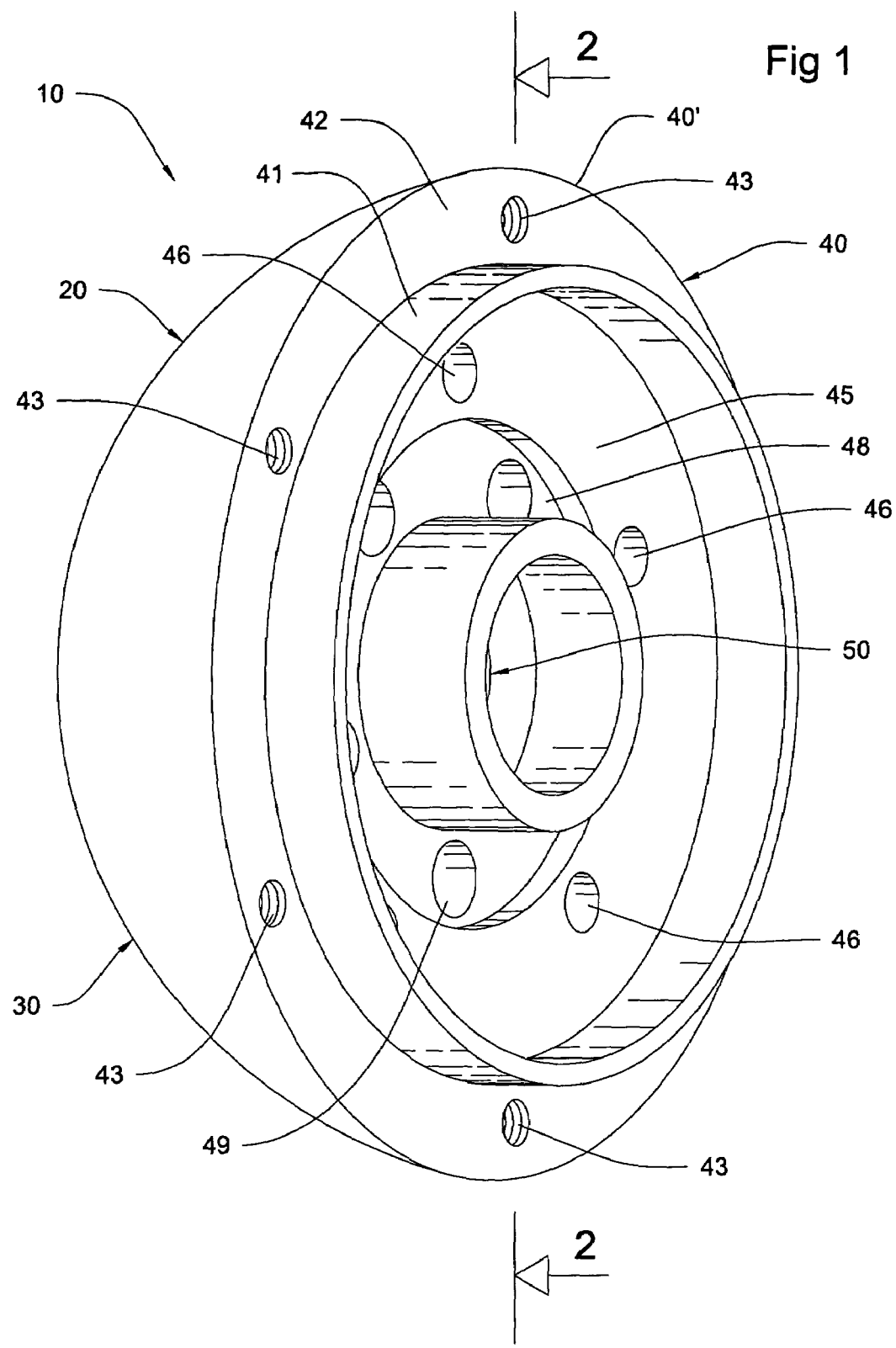
FIG. 1 represents an isometric view of the hub adapter object of the present application.

Referring now to the drawings, where the motorcycle hub adapter object of the present application is generally referred to with numeral 10, it can be observed that it basically includes housing assembly 20 mounted to a rim 400 on one side 30. Brake disk rotor assembly 100 and driven flange assembly 200 are also mounted to housing assembly 20 on the opposite side 40. Wheel axle assembly 300 supports hub adapter 10.

Figure 2:
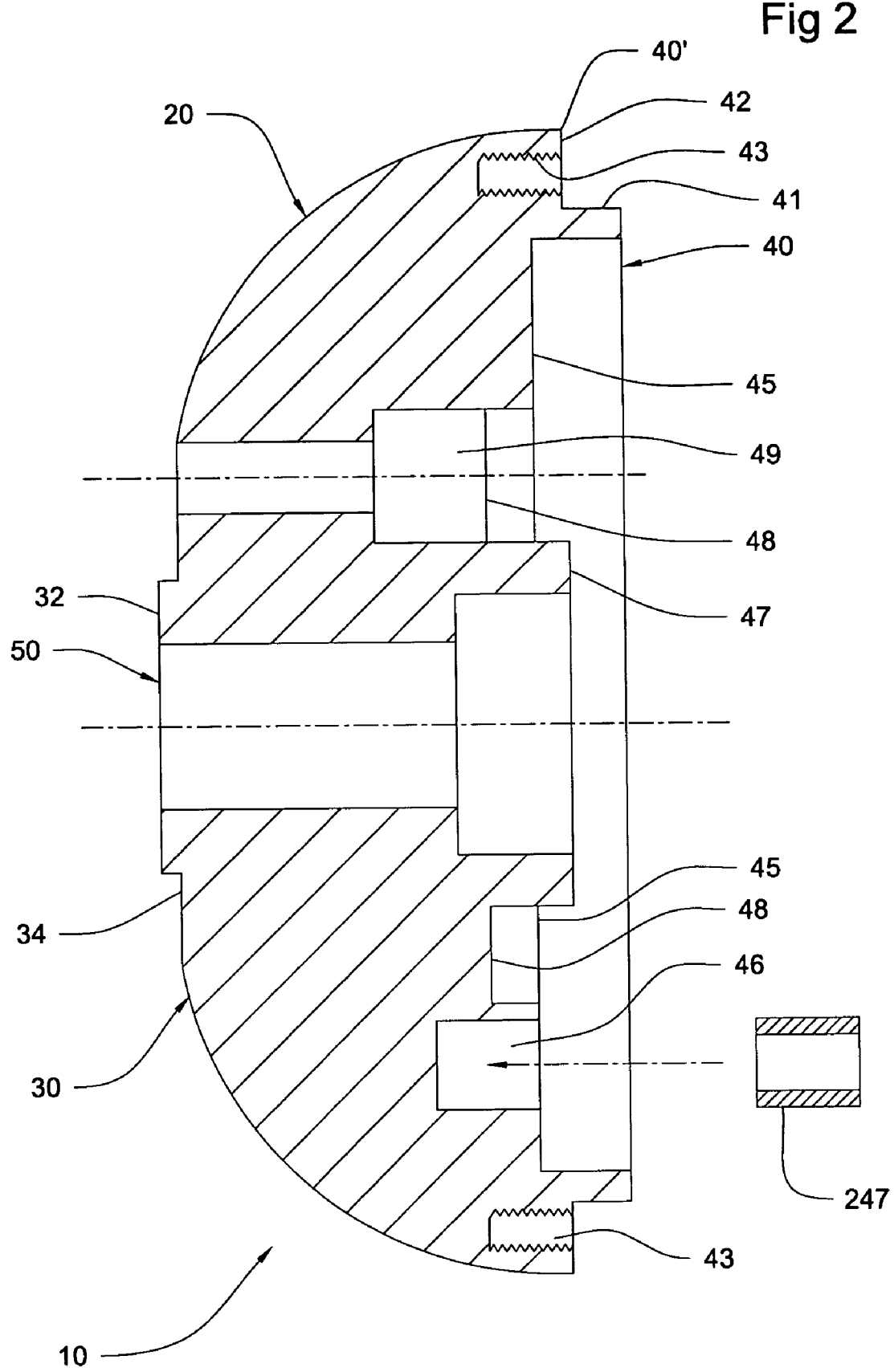
FIG. 2 shows a cross-section view taken along line 2—2 from FIG. 1, showing the openings and steps of the present invention.
Figure 3:
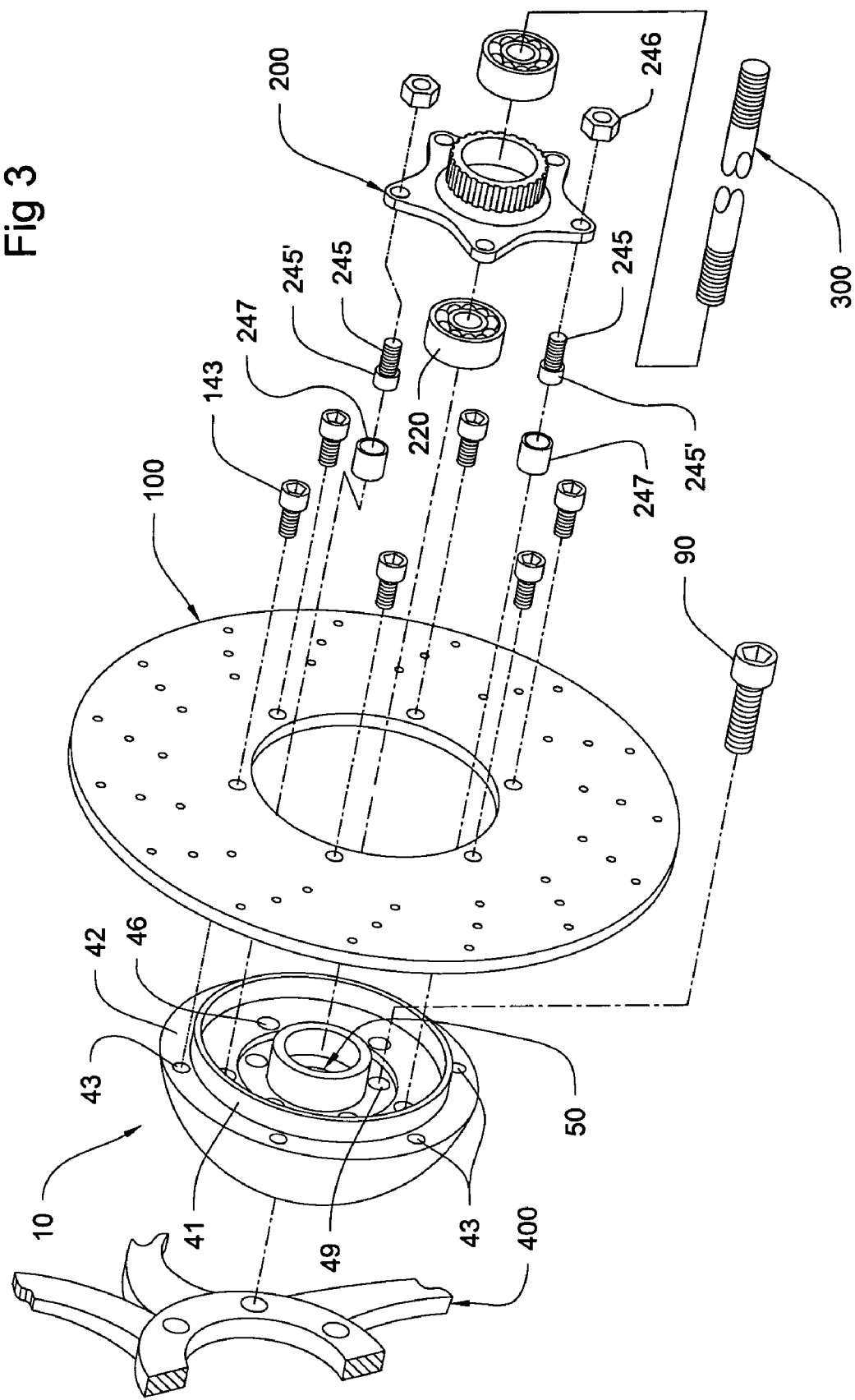
FIG. 3 illustrates an exploded view of the hub adapter mounted to a wheel system, the brake disk rotor assembly and the driven flange assembly.

As shown in FIGS. 1 and 2, housing assembly 20 has a substantially hemispheric shape. As best seen in FIG. 2, housing assembly 20 includes sides 30 and 40. Side 30 has a substantially convex shape with round flattened and raised radial end 32, annular flattened and stepped radial area 34 and central through opening 50. Annular flattened and depressed area 34 is adjacent to round flattened and raised radial end 32 to which rim 400 is abuttingly mounted with fastening members 90. Central through opening 50 extends perpendicularly from round flattened end 32 and the former has cooperative dimensions to receive wheel axle assembly 300 therethrough, as best seen in FIG. 4.

As shown in FIGS. 1 and 2, side 40 is opposite to convex side 30. Side 40 includes peripheral circular edge 40' with peripheral circular axial wall 41 at a predetermined distance from peripheral circular edge 40' defining outer annular radial surface 42 in between. Side 40 also includes stepped annular radial surface 45 adjacent and interior to peripheral circular axial wall 41 and stepped with respect to outer annular radial surface 42. Stepped annular radial surface 45 is positioned at a plane parallel and spaced apart a predetermined distance from the plane of annular surface 42. Furthermore, side 40 includes annular radial surface 48 positioned at a plane that is parallel and spaced apart from the plane of annular surface 45.

Figure 4:
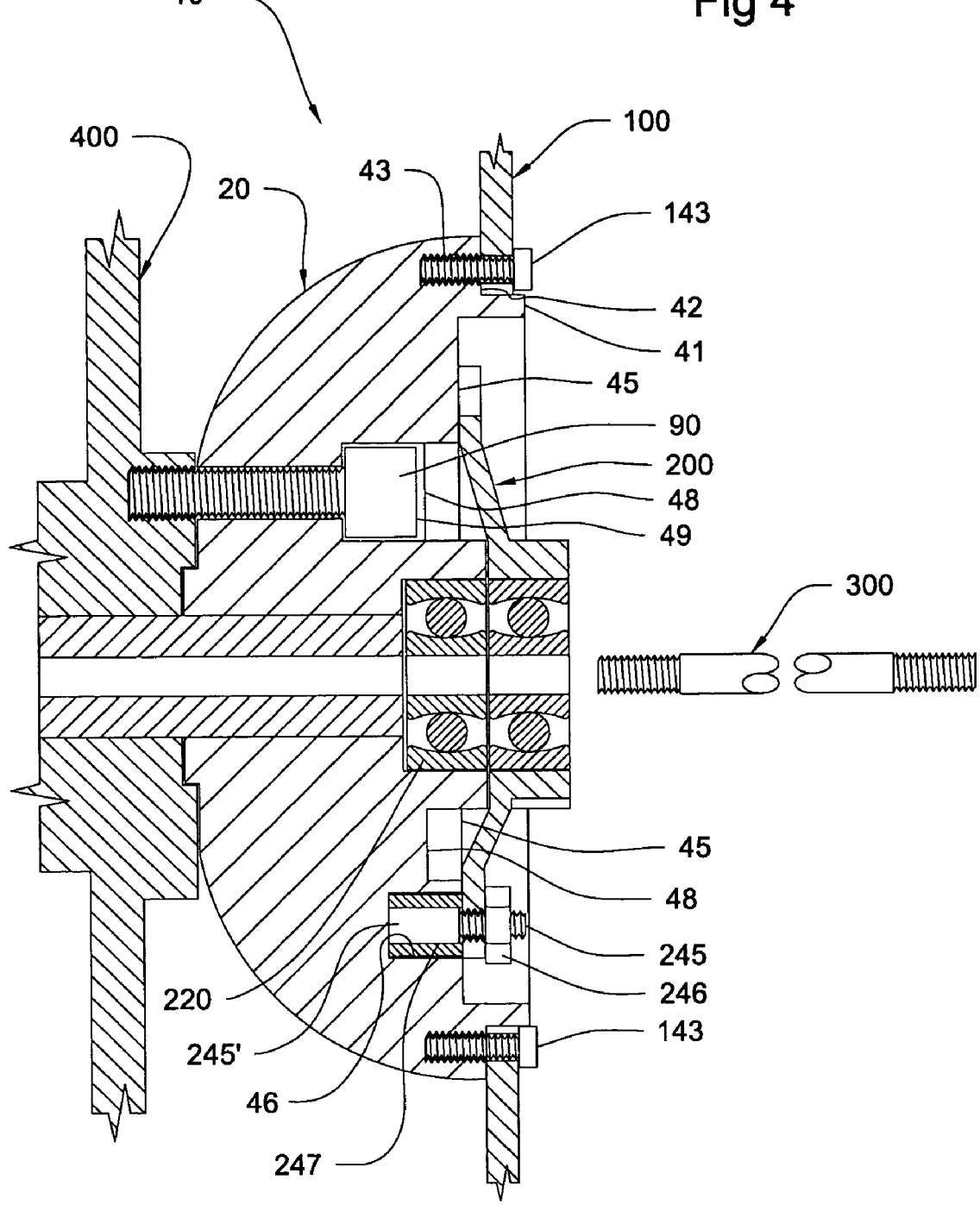
FIG. 4 is a cross section of the hub adapter mounted to the wheel system and other parts shown in FIG. 3.

Annular surface 42 includes a plurality of threaded openings 43 cooperatively positioned to receive fastening members 143 of brake disk rotor assembly 100, as best seen in FIG. 4.

As best seen in FIG. 4, stepped annular radial surface 45 includes a plurality of holes 46 and a corresponding plurality of sleeve members 247 and fastening members 245, cooperatively receivable therein. Head 245' is pressure fitted inside sleeve 247 leaving the threaded shank to protrude outwardly of hole 46. Fastening assemblies 245 are removably mounted to driven flange assembly 200 with nut members 246.

As seen in FIGS. 1 to 4, stepped annular radial surface 48 includes peripheral axial skirt 47 perpendicularly and outwardly extending therefrom. Peripheral axial skirt 47 cooperates with driven flange assembly 200 to house ball bearing 220 for rotatably supporting axle 300, as best seen in FIG. 4. Stepped annular radial surface 48 includes a plurality of through holes 49 and a corresponding plurality of fastening members 90 cooperatively housed within through holes 49. Fastening members 90 are removably mounted to rim assembly 400 so that brake disk rotor assembly 100 is kept at the farthest possible distance from rim assembly 400 to minimize the visual obstruction of the latter.

It can be seen that with hub adapter 10 having driven flange assembly 200 and brake disk motor assembly 100 mounted to side 40, rim assembly 400 the visual obstruction of the latter is substantially minimized and the other side of the wheel free of any detracting components.

Figure 5:
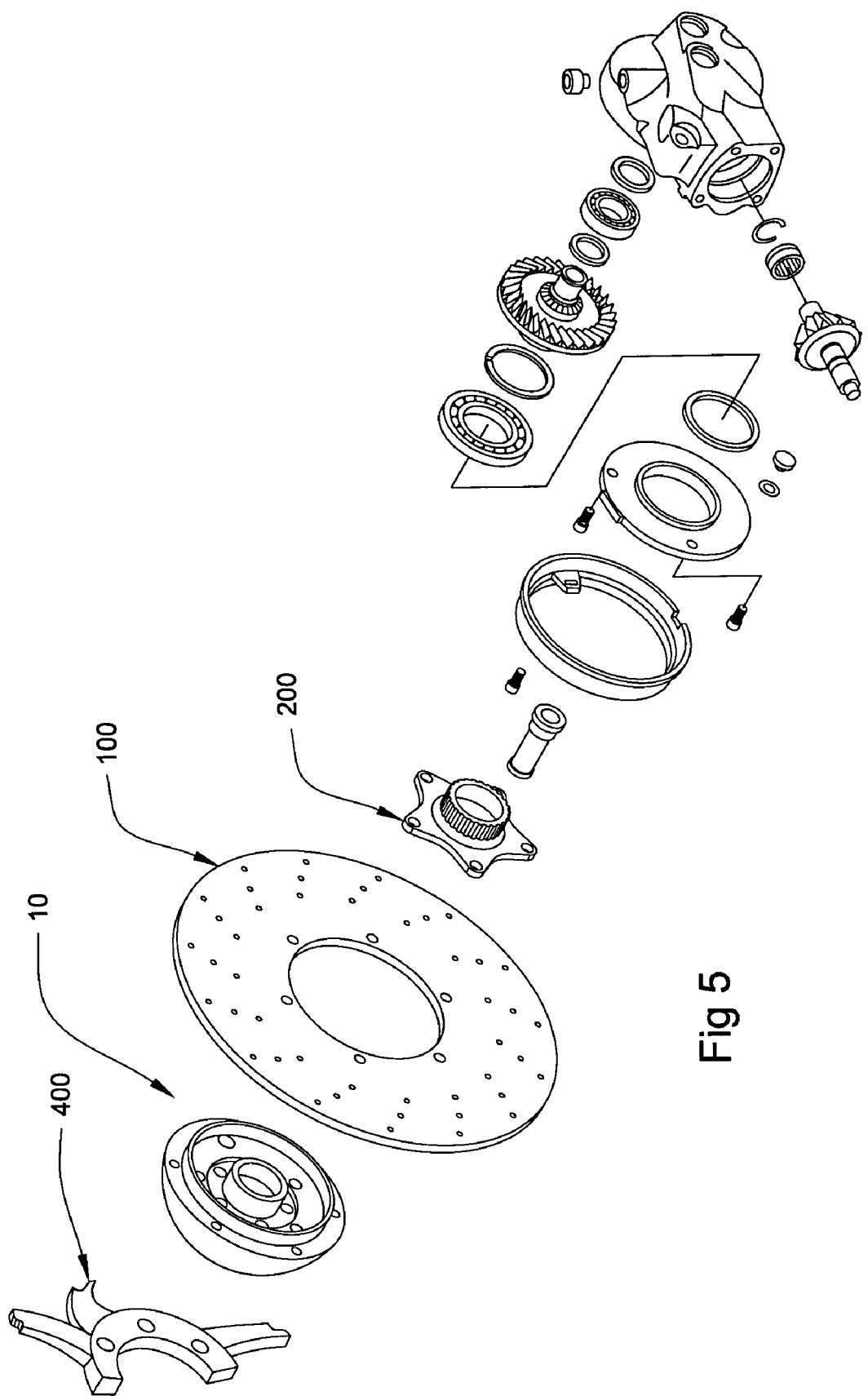
FIG. 5 is an exploded view of the hub adapter mounted to a driven gear system typically found in some motorcycles.

FIG. 5 shows the hub adapter mounted to a driven gear system typically found in some motorcycles.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A hub adapter for shaft driven motorcycles comprising:
A) housing means having a substantially hemispheric shape with first and second sides, said first side having a substantially convex shape with a round flattened and raised radial end to which a rim assembly is mounted and a central through opening extending perpendicularly from said round flattened and raised radial end having cooperative dimensions to receive an axle therethrough, an annular flattened and stepped area is adjacent to said round flattened and raised radial end, said second side being opposite to said first side and said second side including a peripheral circular axial edge with a peripheral circular wall perpendicularly extending from said second side a first predetermined distance from said peripheral circular edge, defining a first annular radial surface in between, a second annular radial surface is adjacent and interior to said peripheral circular axial wall, a third annular radial surface is stepped from said second annular surface and positioned at a plane that is parallel and spaced apart from the plane of said second annular surface a second predetermined distance, a peripheral axial skirt perpendicularly and outwardly extending from said third annular radial surface, and said first annular radial surface including a plurality of threaded openings cooperatively positioned to receive the fastening means of a brake disk rotor assembly, said second annular radial surface including a first plurality of holes and a corresponding first plurality of first fastening means cooperatively housed therein and said first fastening means being removably mounted to a driven flange assembly, said third annular radial surface including a second plurality of through holes and a corresponding second plurality of second fastening means cooperatively receivable within said second plurality of through holes, said second fastening means removably mounted to a rim assembly so that said brake disk rotor assembly is kept at the farthest possible distance from said rim assembly to minimize the visual obstruction of the latter.

2. The hub adapter set forth in claim 1 wherein said peripheral axial skirt cooperates with said driven flange assembly to house a ball bearing means for rotatably supporting said axle.

3. The hub adapter set forth in claim 2 wherein said fastening means includes a sleeve member housed within said hole and fastening members housed within said sleeve and further including a threaded shank with cooperative dimensions that cause the distal end of said shaft to protrude outwardly and a nut member cooperatively engaged with said threaded shank to support said driven flange assembly.

* * * * *